(12) United States Patent
Yu et al.

(10) Patent No.: US 9,417,349 B1
(45) Date of Patent: Aug. 16, 2016

(54) PICKING FAULTS IN A SEISMIC VOLUME USING A COST FUNCTION

(71) Applicant: IHS Global Inc., Englewood, CO (US)

(72) Inventors: Yingwei Yu, Katy, TX (US); Clifford L. Kelley, Sugar Land, TX (US); Irina M. Mardanova, Houston, TX (US)

(73) Assignee: IHS GLOBAL INC., Englewood, CO (US)

( * ) Notice: Subject to any disclaimer, the term of this patent is extended or adjusted under 35 U.S.C. 154(b) by 647 days.

(21) Appl. No.: 13/895,198

(22) Filed: May 15, 2013

Related U.S. Application Data

(60) Provisional application No. 61/764,351, filed on Feb. 13, 2013.

(51) Int. Cl.
*G01V 1/00* (2006.01)
*G01V 1/30* (2006.01)

(52) U.S. Cl.
CPC .................................... *G01V 1/302* (2013.01)

(58) Field of Classification Search
CPC ............................. G01V 1/302; G01V 1/301
USPC ........................................................ 367/38
See application file for complete search history.

(56) References Cited

U.S. PATENT DOCUMENTS

| | | | |
|---|---|---|---|
| 4,800,539 A | 1/1989 | Corn et al. | |
| 5,831,935 A | 11/1998 | Luo et al. | |
| 5,930,730 A | 7/1999 | Marfurt et al. | |
| 6,018,498 A | 1/2000 | Neff et al. | |
| 6,278,949 B1 | 8/2001 | Alam | |
| 6,950,751 B2 | 9/2005 | Knobloch | |
| 7,069,149 B2 | 6/2006 | Goff et al. | |
| 7,308,139 B2 | 12/2007 | Wentland et al. | |
| 7,519,206 B2 | 4/2009 | Mulet-Parada et al. | |
| 7,627,429 B2 | 12/2009 | Li et al. | |
| 7,729,862 B2 | 6/2010 | Dewarrat | |
| 8,055,026 B2 | 11/2011 | Pedersen | |
| 8,265,876 B1 | 9/2012 | Yu et al. | |
| 8,447,524 B2 * | 5/2013 | Chen | G01V 1/32 702/13 |
| 8,665,270 B2 * | 3/2014 | Buscema | G06F 17/10 345/421 |
| 2003/0055598 A1 | 3/2003 | Gillard et al. | |
| 2006/0122780 A1 | 6/2006 | Cohen et al. | |
| 2007/0147682 A1 | 6/2007 | Chang et al. | |
| 2010/0270026 A1 | 10/2010 | Lazaratos et al. | |
| 2012/0209526 A1 * | 8/2012 | Imhof | G01V 1/306 702/5 |
| 2013/0279293 A1 | 10/2013 | Xu et al. | |

OTHER PUBLICATIONS

Admasu, Fitsum. "A Stochastic Method for Automated Matching of Horizons Across a Fault in 3D Seismic Data". Dissertation. Otto-von-Guericke-Universitat. Print. 145 pages. 2008.

(Continued)

*Primary Examiner* — Mark Hellner
(74) *Attorney, Agent, or Firm* — Faegre Baker Daniels LLP

(57) ABSTRACT

Picking a fault in seismic data samples is described. In one example, a minimum spanning tree is used. In another example, input seismic attribute data is determined based on the seismic data samples. Seeds are selected that represent locations in the seismic volume using the attribute data. A principle grid is generated using the seeds. A fault is picked in the seismic volume by applying a least costs process, for example a minimum spanning tree, to the principle grid. The fault is then interpolated to generate a fault surface of the seismic volume.

19 Claims, 13 Drawing Sheets

(56) References Cited

OTHER PUBLICATIONS

Fitsum Admasu et al. "An Approach Towards Automated Fault Interpretations in Seismic Data". Simulation and Visualisierung, 2005. pp. 207-219. Mar. 2005.

Yu et al. "Angular Disinhibition Effect in a Modified Poggendorff Illusion". In Kenneth D. Forbus, Dedre Gentner, and Terry Regier, Editors. Proceedings of the 26th Annual Conference of the Cognitive Science Society. 6 pages. 2004.

Yu et al. "Automatic Horizon Picking in 3D Seismic Data Using Optical Filters and Minimum Spanning Tree". Seismic Micro-Technology, Inc. Society of Exploration Geophysicists. 5 pages. 2011.

Yu et al. "Neural Model of Disinhibitory Interactions in the Modified Poggendorff Illusion". Biological Cybernetics. vol. 98(1). pp. 75-78. 2008.

Zhang et al. "Binary Gabor Pattern: An Efficient and Robust Descriptor for Texture Classification". Image Processing (ICIP). 19th IEEE International Conference. Print. pp. 81-84. 2012.

* cited by examiner

Single Seed

Multiple Seeds

PICKING FAULTS IN A SEISMIC VOLUME USING A COST FUNCTION

CROSS REFERENCE TO RELATED APPLICATIONS

This application claims the benefit of U.S. Provisional Application No. 61/764,351 filed Feb. 13, 2013, which is hereby incorporated by reference.

FIELD

The present description relates to picking faults of seismic traces and, in particular, to picking faults using a cost-based picking method.

BACKGROUND

The oil and gas industries regularly employ seismic reflection surveys to image the earth's subsurface, looking for geologic structures and environments capable of generating, migrating, and trapping commercial hydrocarbon deposits. Geoscientists use a variety of different seismic sections including two dimensional (2D) seismic slices and three dimensional (3D) seismic volumes to more fully define geologic structural and stratigraphic features commonly associated with hydrocarbon discoveries, such as subsurface faults, unconformities, channels, and submarine fans. The slices and volumes are built from reflection survey data collected from a slice or volume of the subsurface. Today, 3D seismic is increasingly being employed to detect and map natural fracture systems that can greatly influence the effective permeability of producing reservoirs, thereby affecting the overall economics of developing oil & gas fields.

Seismic reflection surveys are performed using sensors placed on land, in the sea, and on the sea floor. Received reflections are noise-filtered and the data are otherwise conditioned for interpretation. A typical record of seismic echoes as detected by a single receiver at the surface is a trace in the shape of a sinusoidal curve as a function of time. Seismic echoes oscillate between compression and rarefaction over a period of several seconds and this rise and fall in pressure with time is recorded for processing and analysis. The amplitude generally reflects the nature of the formation, while the time generally reflects the depth below the receiver. A seismic trace may be subject to multipath, interference, echoes and other effects that reduce the accuracy of the trace. As a result the traces are filtered, conditioned, and interpreted. An interpreter may have several thousand or several million traces to interpret in a single survey.

One element of interpreting subsurface rock and fluid characteristics as well as the presence of faults and channels is the analysis of properties of the recorded seismic waveforms known as seismic attributes. Various attributes may be determined in a variety of different ways from elements of the seismic waves themselves, such as amplitude, phase, frequency, and attenuation. There are also attributes associated with the differences in adjacent recorded waveforms such as similarity or semblance, discontinuity, and attenuation. These latter attributes are more typically used to identify changes from one recorded signal to another. As a result they reveal subtle structural and stratigraphic features within a 2D slice or 3D seismic volume such as faults, fractures, channels, and salt domes.

SUMMARY OF THE INVENTION

Picking a fault in seismic data samples is described. In one example, a minimum spanning tree is used. In another example, input seismic attribute data is determined based on the seismic data samples. Seeds are selected that represent locations in the seismic volume using the attribute data. A principle grid is generated using the seeds. A fault is picked in the seismic volume by applying a least costs process, for example a minimum spanning tree, to the principle grid. The fault is then interpolated to generate a fault surface of the seismic volume.

BRIEF DESCRIPTION OF THE DRAWING FIGURES

Embodiments of the invention are illustrated by way of example, and not by way of limitation, in the figures of the accompanying drawings in which like reference numerals refer to similar elements.

DETAILED DESCRIPTION

Faults, including fractures, channels, and other features can be picked or isolated from seismic attribute data. In embodiments, a minimum spanning tree (MST) is used to pick faults. A spanning tree is a subgraph of nodes connected to each other by edges. The edges can be associated with a cost to traverse from one node to the next, so that the MST is the subgraph with the minimum cost. The costs for the MST can be associated with a confidence in a particular pick where each node of the spanning tree corresponds to a pick. The confidence can be based on energy ratios, physical distances between nodes, and variations in orientations. The MST may be used to define parent-child relationships (such as a parent fault pick, and a child fault pick), cost or confidence, seeds (at which a fault picking process starts, stopping criteria etc. A principle grid may be used to define the coordinates for the parent and child nodes using particular fault attributes and seeds and to transform frames of reference. The orientations from an attribute may be used as a confidence or cost factor and as a stopping criteria in the MST.

Figure 1:
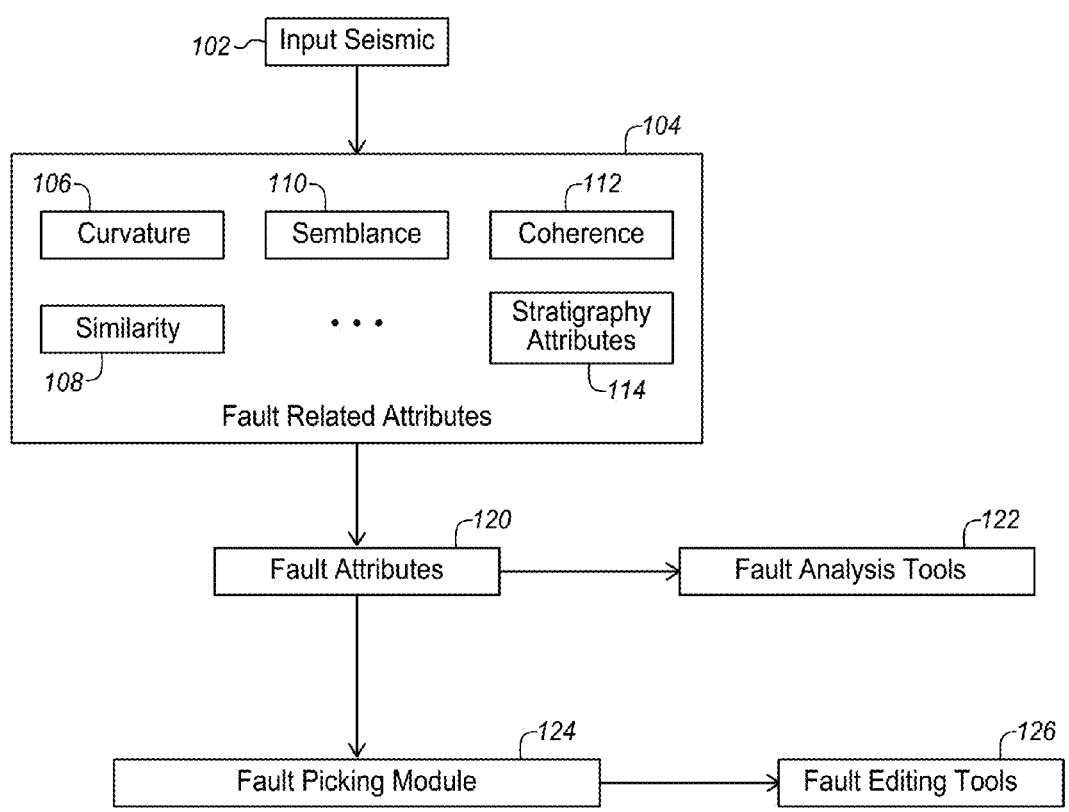
FIG. 1 is a block diagram of a high level fault picking workflow according to an embodiment of the invention.

A block diagram of a fault picking high-level workflow is shown in FIG. 1 and includes one or more of the illustrated components. As shown this workflow starts with input seismic data 102 which is supplied to a process 104 for determining fault related attributes. These attributes are different measure of the input seismic data that make it easier to find and pick faults. The attributes may include any one or more of the listed attributes as well as other attributes. The choice of attributes depends on the available tools, the nature of the formation, and the processes that might be used for picking and finding faults. The listed attributes include curvature 106, similarity 108, semblance 110, coherence 112, stratigraphy attributes 114 and others.

The fault related attributes are supplied as an output 120 and can be tendered to fault analysis tools 122. These tools can provide a variety of different kinds of information about the attributes and about any faults that may be found. The fault attributes are also supplied to a fault picking module 124 that is used to find faults using the supplied fault attributes. The results of the fault picking module can be applied to any of a variety of fault editing tools 126.

Figure 2:
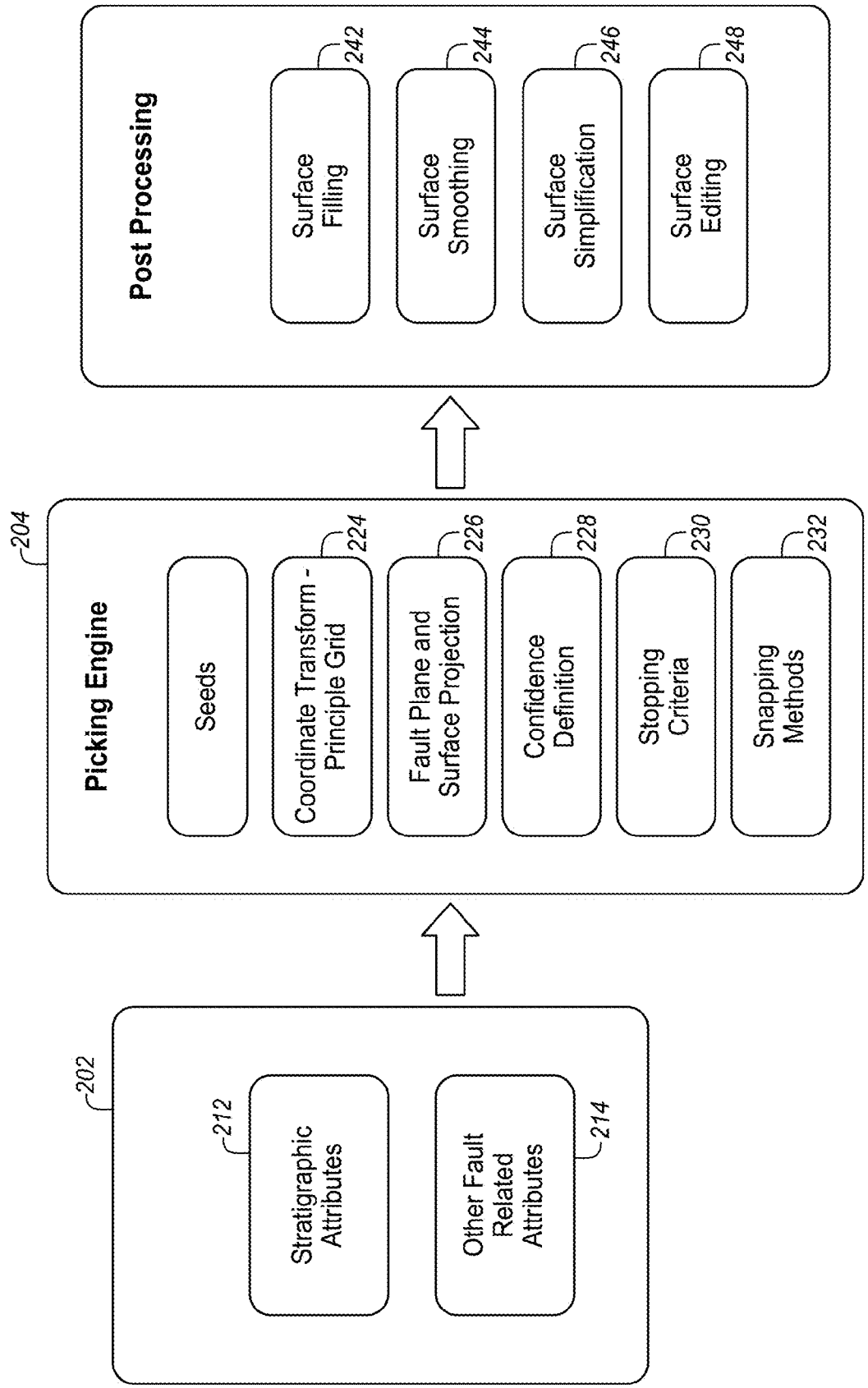
FIG. 2 is a block diagram of a fault picking module according to an embodiment of the invention.

The fault picking module is shown in more detail in the block diagram of FIG. 2. Such a fault picking module may be used to pick faults in 3D (Three Dimensions) using a minimum spanning tree (MST) and for many other fault picking processes. For the fault picking module 124, there may be three primary modules shown here as an input module 202, a picking engine 204, and a post processing module 206. The input module, receives stratigraphic attributes 212 and other fault related attributes 214. These are supplied to the picking engine 204.

The picking engine include modules for seed identification 222, principle grid definition and coordinate transformation 224, fault plane and surface projection 226, confidence definition 228, stopping criteria 230 and snapping methods 232. Each of these will be described in more detail below.

The picking engine results are in the form of fault surfaces in 3D. The surfaces are applied to the post processing module 206 which includes surface filling 242, surface smoothing 244, surface simplification 246, and surface editing 248. Each of these processes may be applied to a fault surface to refine and improve the accuracy and placement of the surface and to make the fault surface easier for a human user to observe and study.

Figure 3:
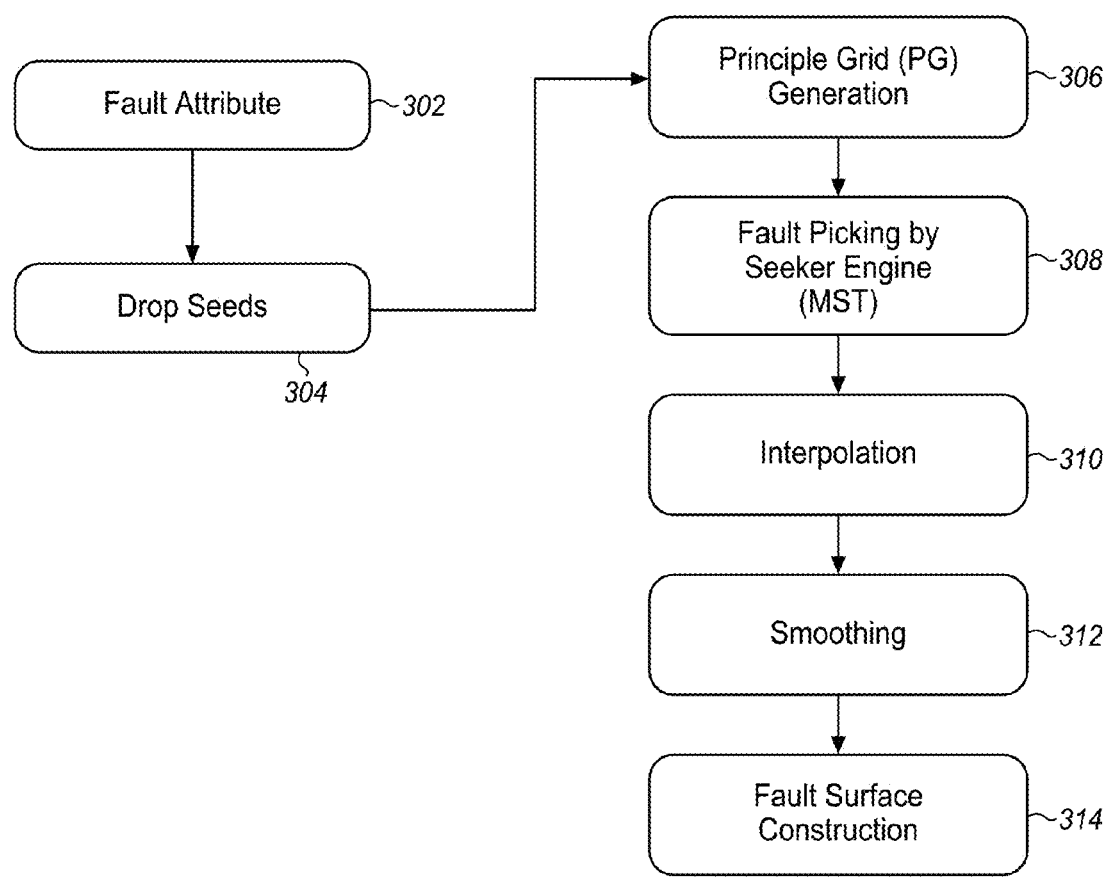
FIG. 3 is a simplified process flow diagram of fault picking according to an embodiment of the invention.

FIG. 3 is a simplified process flow diagram of a process that may be employed by the fault picking module. Each of the operations shown in FIG. 3 is described in more detail below. The fault picking process begins with input information typically in the form of fault attributes 302. The fault attributes are used to drop seeds 304 on the volume of the formation that is being studied. The seeds are used as starting points for finding fault surfaces. There may be one or many seeds, depending on the particular implementation. A principle grid (PG) is generated 306 and the seeds are placed on the principle grid.

With the principle grid in place various faults can be picked 308 starting at a seed and determining paths to other points on the grid. As described in more detail below, faults may be picked by applying grid points as nodes on a minimum spanning tree. The paths between nodes can be selected based on a least costs analysis.

With the fault points picked 308, the results can be improved and the edges between nodes extended using interpolation 310. The interpolated results are smoothed 312 and these are rendered into surfaces 314. The additional post processing operations 206 may be applied as suggested in FIG. 2, depending on the particular implementation.

Figure 4:
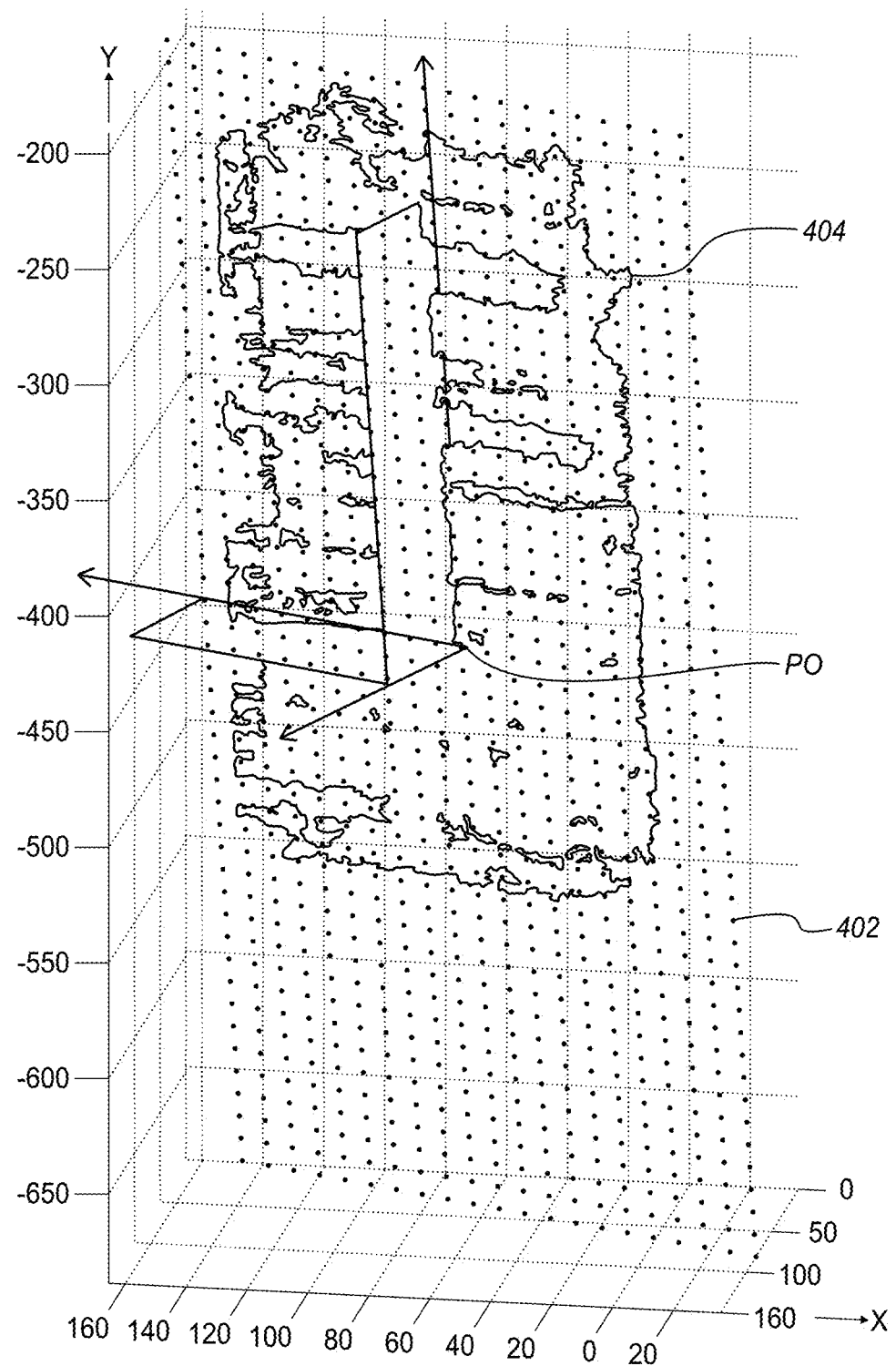
FIG. 4 is a diagram of a graph representation of a principle grid plotted against an X-Y-Z space according to an embodiment of the invention.

FIG. 4 is a diagram of an example principle grid that may be used in the fault seeking operations described herein. The principle grid 402 is a linear plane that roughly matches with the fault surface. It may be derived from single or multiple seeds. It converts the X-Y-Z space of the seismic volume to a U-V-W space for the minimum spanning tree. The cell size of the grid is adjustable to suit the number of data points in the volume and the desired accuracy.

The principle grid may be defined by its attributes, which, in the present example, are at least: P0, the original seed point; $\vec{u}$, a vector to the u-axis from P0; $\vec{v}$, a vector to the v-axis from P0; $\vec{w}$, a vector to the w-axis from P0; θ, the azimuth of the principle grid and the angle between the vector $\vec{w}$ and the x-axis; and φ, the dip of the principle grid's norm along vector $\vec{w}$. As shown, the fault information can be transformed onto the PG and mapped as a data set onto the PG.

Figure 5A:
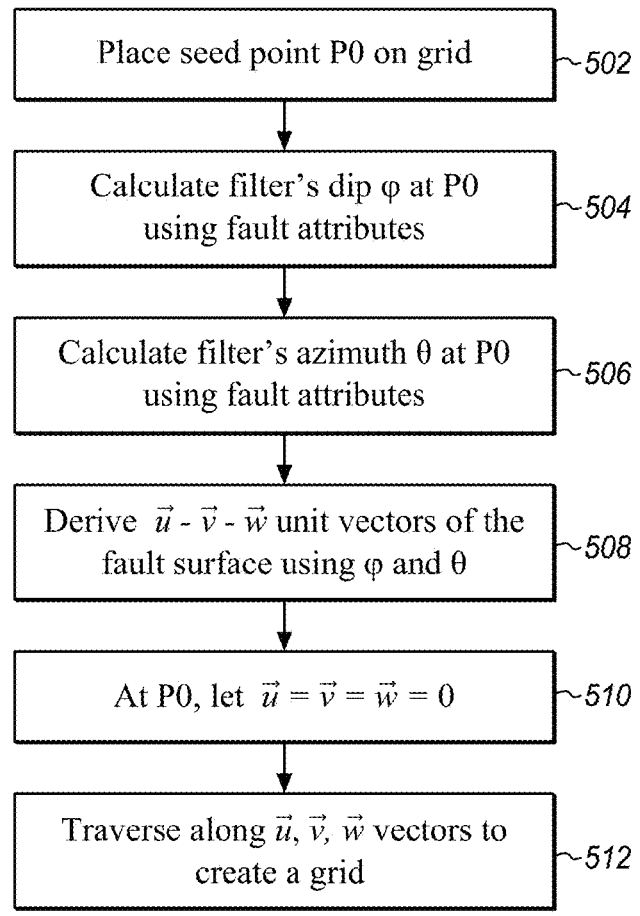
FIG. 5A is a process flow diagram of calculating a principle grid from a single seed using fault attribute data according to an embodiment of the invention.
Figure 5B:
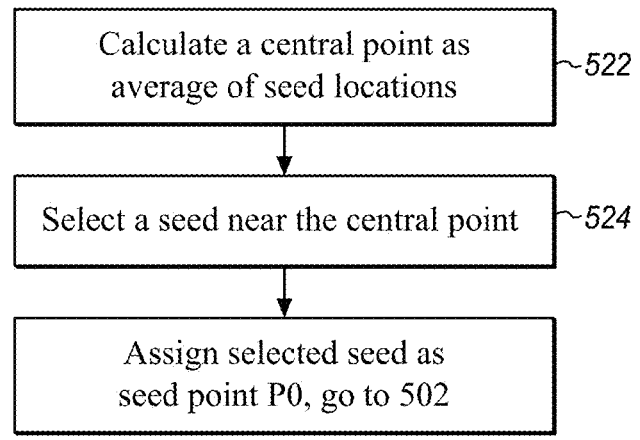
FIG. 5B is a process flow diagram of calculating a principle grid from multiple seeds using fault attribute data according to an embodiment of the invention
Figure 6:
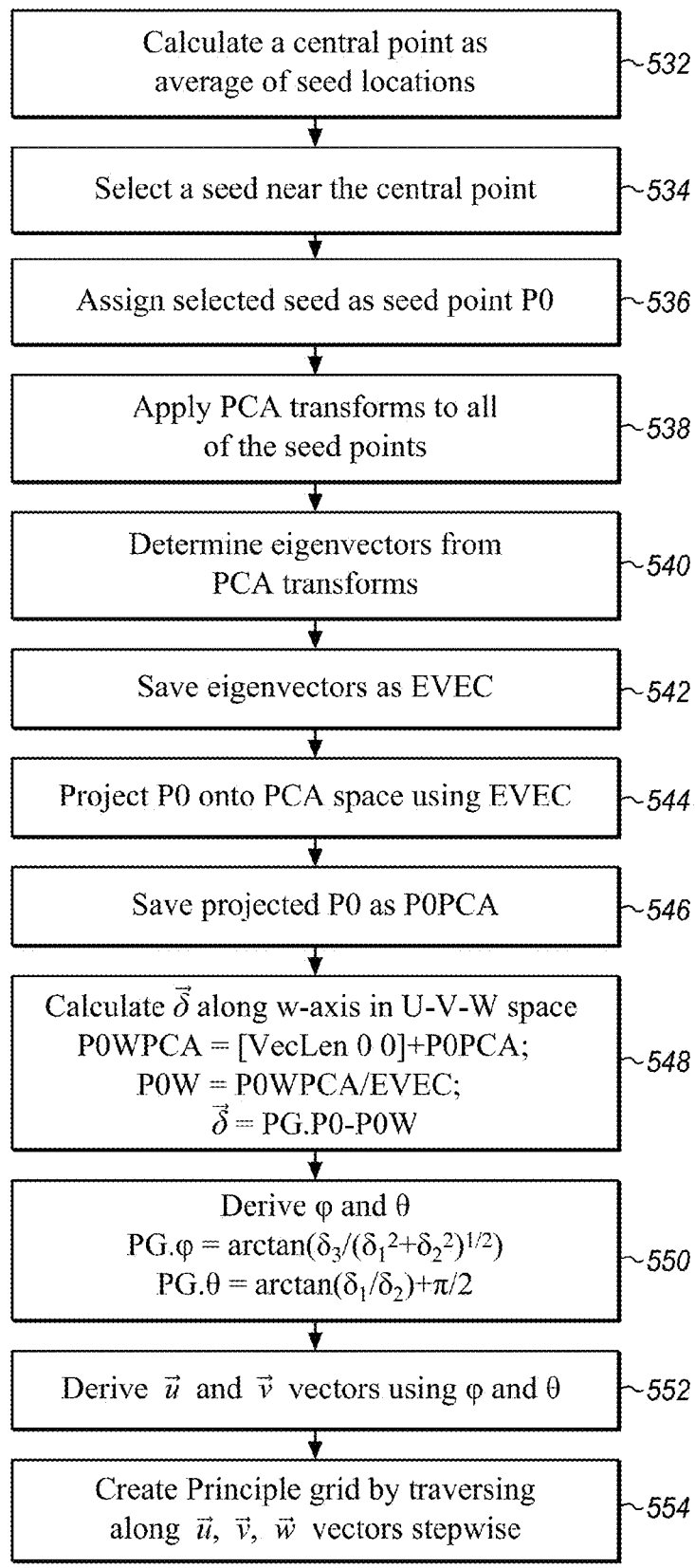
FIG. 6 is an alternative process flow diagram of calculating a principle grid from multiple seeds using fault attribute data according to an embodiment of the invention.

The Principle Grid (PG) can be calculated from a single seed point or from multiple seeds as shown in the process flow diagrams of FIGS. 5A, 5B, and 6. When there is a single seed derived from an attribute that includes a fault surface's dip and azimuth, φ and θ, then the principle grid may be determined as shown in FIG. 5A. At 502, the single seed is placed on a point in a grid. This point becomes the origin P0 of the PG. At 504 and 506, the dip φ and azimuth θ extracted from the attributes are associated with the seed location P0.

At 508 u-v-w unit vectors may be derived using φ and θ. This is shown in more detail in FIGS. 6 and 7. At 510, the $\vec{u}$, $\vec{v}$, and $\vec{w}$ vectors can be defined as zero vectors at the origin of the principle grid, P0, i.e. $\vec{u}=\vec{v}=\vec{w}=0$.

Using the established origin P0 and the directions of the $\vec{u}$, $\vec{v}$, $\vec{w}$, vectors, the rest of the u-v-w surface can be established together with its resolution at 512. In one example a single step sized vector, ru, rv, and rw is established along each vector direction, u, v, w. These step size vectors can be used to traverse along the calculated $\vec{u}$, $\vec{v}$, $\vec{w}$ vectors in both positive and negative directions to create a grid throughout the whole seismic volume. In this way ru, rv, and rw are the resolutions of the grid in each direction.

FIG. 5B is a process flow diagram of additional operations that may be used if there are multiple seeds that derive from the fault related attributes of the input seismic data. In the example of FIG. 5B, a central point may be determined using multiple seeds. This central point may be applied to the process flow diagram of FIG. 5A to determine the principle grid.

At 522, if multiple seeds are used then the grid may be calculated by first calculating at 522 a central point by averaging all the seeds' locations. At 524, a seed is selected among the multiple seeds that is nearest to the central point. At 526, the selected seed is then assigned as the single seed point P0 upon which the principle grid is based. The selected seed may then be used in the same way as the single seed of FIG. 5A to derive the principle grid starting at 502.

For fault related attributes that do not provide an attribute that includes dip and azimuth, φ and θ, information, the Principle Grid can be calculated as shown for example in the process flow diagram of FIG. 6. In this example, multiple seeds are used to establish the Principle Grid.

When there are multiple seeds, they may be used to form a plane. Depending on the attributes and the methodology used to determine the seeds, the two planes may be VSD1+VSD2, VSD1+BM1, BM1+BM2, or another combination.

As shown in FIG. 6, a principle grid, PG, may be determined by first determining the principal seed P0 to form the basis for the grid. At 532, the central point P0 is determined by averaging the seed points, selecting a seed near the average at 534, and assigning the central point as the Principle Grid's origin P0 at 536. While diagram FIGS. 5B and 6 refer to averaging, a central point and corresponding seed may be determined in a variety of other ways. By choosing a point near the middle of the seeds, the point will also be near the middle of the seismic volume or at least the interesting part of the seismic volume for finding faults. The average may be determined in different ways using different aspects of the seeds as the values to average. The examples herein assume that the central point has a position somewhere near the middle of the input seismic volume. Such a position is shown in FIG. 4.

At 538, PCA transforms are applied to all of the seed points, and at 540 eigenvectors are determined from the PCA transforms. At 542, the eigenvectors from the PCA transforms are saved as EVEC. At 544 the origin of the PG, P0, is projected onto PCA space using EVEC and at 546, the projected point is saved as P0PCA.

At 548 a delta-vector, $\vec{\delta}$, along the w-axis in U-V-W space is calculated. This may be done in a variety of different ways. In one example as shown in the operations below, it is performed using the $\vec{w}$ vector. An example set of operations is:

P0WPCA=[VecLen 0 0]+P0PCA; (where VecLen is a constant, e.g. 50) Here VecLen is a given constant. P0PCA is the origin point P0 on the Principle Grid (PG) projected on PCA space. P0WPCA is a point in PCA space, which extends on the w-axis for VecLen

*P0W=P0WPCA/EVEC;*

With EVEC derived above, P0WPCA is transformed back to the X-Y-Z domain, and saved as P0W $\vec{\delta}$=*PG·P0−P0W.*

The difference between P0 on the principle grid and P0W is the delta vector, $\vec{\delta}$, which has three components $\delta_1$, $\delta_2$, and $\delta_3$.

At 550, the principle grid's dip θ and azimuth φ are derived from $\vec{\delta}$. This may be done in a variety of different ways. In one example, the following equations 1 and 2 may be used:

$$PG \cdot \phi = \arctan(\delta_3/(\delta_1^2+\delta_2^2)^{1/2}) \quad \text{(Equation 1)}$$

$$PG \cdot \theta = \arctan(\delta_1/\delta_2)+\pi/2 \quad \text{(Equation 2)}$$

At 552, the $\vec{u}$ and $\vec{v}$ vectors are derived. This may be done as shown and described with respect to FIG. 7. At 554 PG is created by traversing the calculated $\vec{u}$, $\vec{v}$, $\vec{w}$ vectors in both positive and negative directions in steps of a size determined by ru, rv, and rw. This is done to create a grid throughout the whole volume, where ru, rv, and rw are resolutions of the grid.

Figure 7:
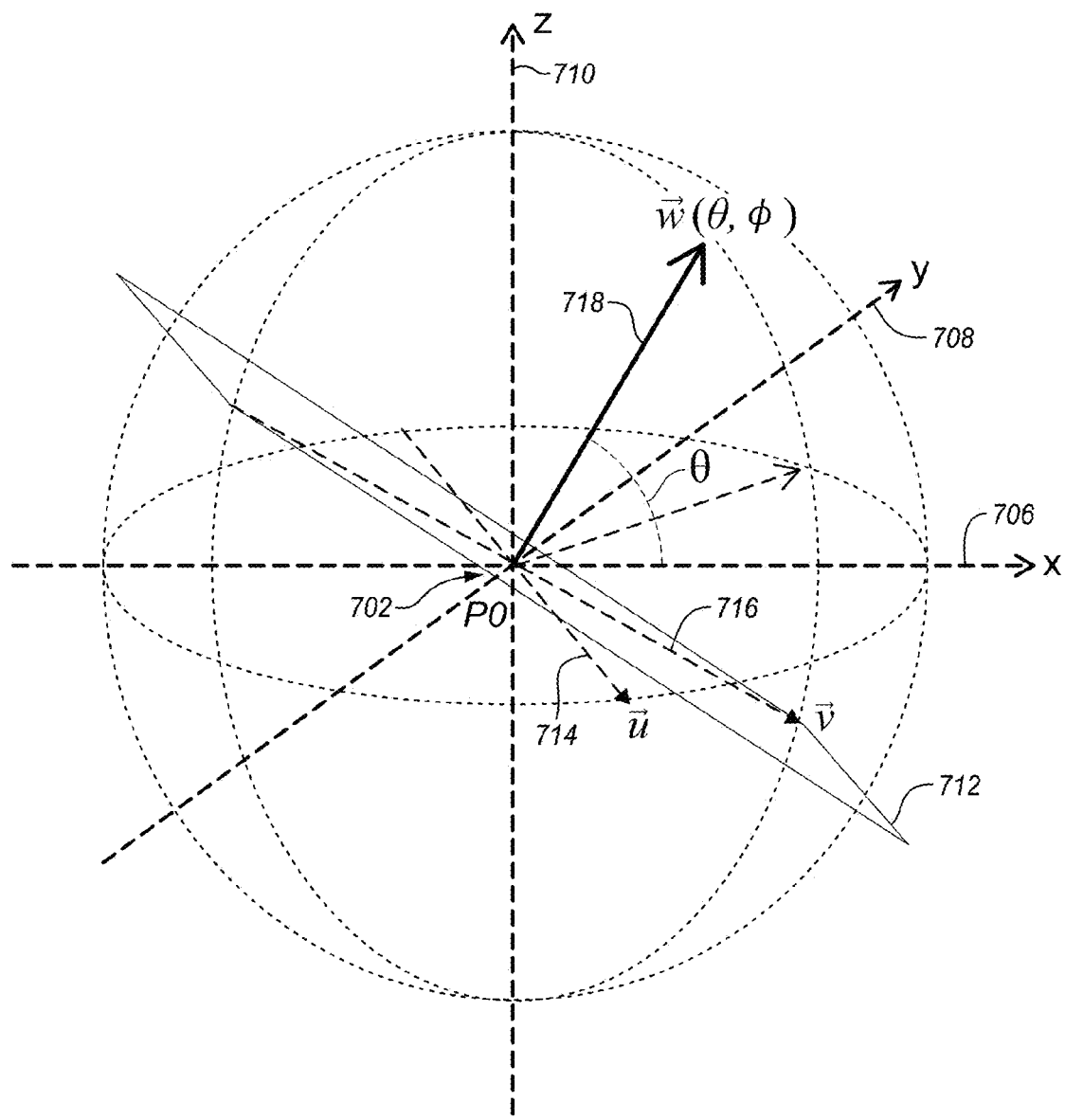
FIG. 7 is a diagram of a unit sphere showing relationships between an X-Y-Z and a U-V-W frame of reference according to an embodiment of the invention.

FIG. 7 is a diagram of a unit sphere with origin at P0 to show the relationship of the X-Y-Z and U-V-W frames of reference. The size of the unit sphere corresponds to the distances ru, rv, rw, on the U-V-W coordinates, respectively. The origin 702 of the sphere 704 corresponds to the central point P0 of the principle grid 712. This origin is also placed at the center of X-Y-Z orthogonal, rectangular axes labeled as 706, 708, and 710 respectively.

The principle grid 712 is shown as also having a center near the origin P0. The u and v axes are orthogonal on the surface of the principle grid. The w axis 718 is normal to the surface of the principle grid and extends from the same origin. The w axis is also aligned with φ, while θ, as mentioned above, corresponds to the angle between w-axis and the x-axis.

The U-V-W vectors for a system as shown in FIG. 7 can be derived with respect to the X-Y-Z grid using φ and θ as shown and described in FIG. 7. In addition, the step sizes ru, rv, rw along the $\vec{u}, \vec{v}, \underline{w}$ vectors in the U-V-W plane can be derived from attributes. In the case of attributes that have an orientation and magnitude, the orientation and magnitude may be used as, for example, a unit vector $\underline{w}$ at point P0. With $\vec{u}$ and $\vec{v}$ being the unit vector of the fault surface associated with the point P0 and $\vec{w}$ being the normal to that surface, the vectors for $\vec{u}, \vec{v}, \vec{w}$, may be defined as in Equation 3:

$$\vec{u} = \begin{pmatrix} \cos(\theta-\frac{\pi}{2}) \\ \sin(\theta-\frac{\pi}{2}) \\ 0 \end{pmatrix} \vec{v} = \begin{pmatrix} \cos(\phi-\frac{\pi}{2})\cos\theta \\ \sin(\phi-\frac{\pi}{2})\sin\theta \\ \sin(\phi-\frac{\pi}{2}) \end{pmatrix} \vec{w} = \begin{pmatrix} \cos\phi\cos\theta \\ \cos\phi\sin\theta \\ \sin\phi \end{pmatrix} \quad \text{(Equation 3)}$$

The transformation from the origin at P0 to a point one step size away at x, y, z can be defined as in Equation 4:

$$\begin{bmatrix} x \\ y \\ z \end{bmatrix} = \begin{bmatrix} x_P \\ y_P \\ z_P \end{bmatrix} + n_u \cdot \vec{u} + n_v \cdot \vec{v} + n_w \cdot \vec{w} \quad \text{(Equation 4)}$$

where $x_p$, $y_p$, $z_p$ define the point P0, $n_u$, $n_v$, $n_w$, define the position in U-V-W coordinates, and the output x, y. z is the same position transformed into X-Y-Z coordinates.

Figure 8:
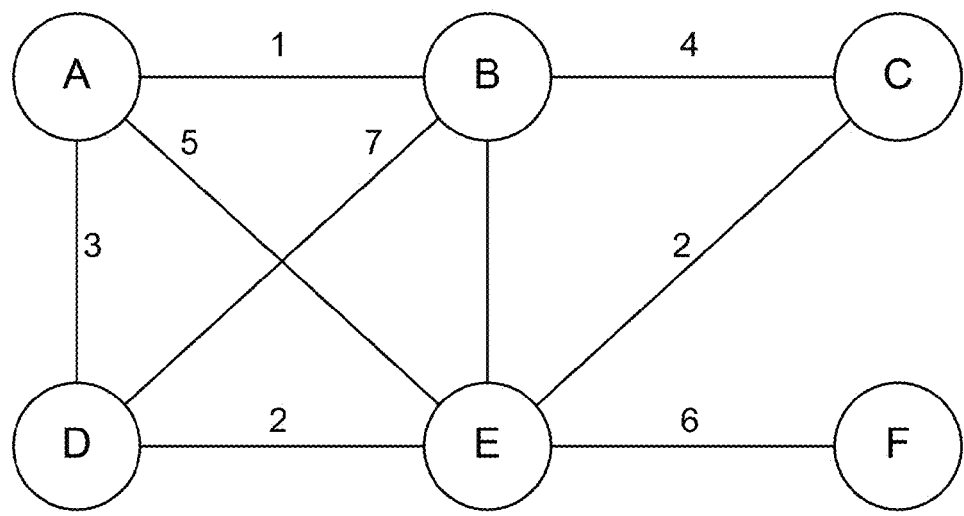
FIG. 8 is a diagram of a spanning tree with six nodes.

FIG. 8 is a diagram of a MST (Minimum Spanning Tree) which can be shown and implemented as a type of a Spanning Tree. The MST is a connected and undirected graph with vertices at the nodes and costs on the edges that connect the nodes. FIG. 8, for example has six nodes A, B, C, D, E, and F. While there are typically many more than six nodes, only six are shown in order to simplify understanding. The nodes correspond to seed points in the principle grid. Each node is connected to each neighboring node by an edge, shown as a connecting line and each edge has a cost associated with it. The costs are shown as a numerical value next to each line. The diagram of FIG. 8 is a spanning tree shown as a sub-graph that is a tree and connects all of the vertices or nodes together. In any real data set, there may be multiple spanning trees for the same graph. The MST may be defined as the spanning tree with the minimum costs.

Figure 9:
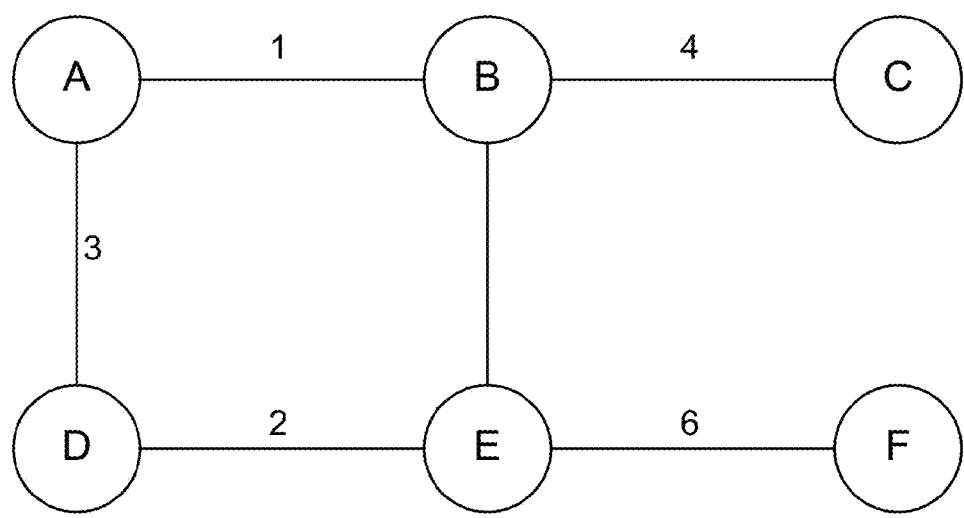
FIG. 9 is a diagram of a minimum spanning tree with the six nodes of FIG. 8 according to an embodiment of the invention.

FIG. 9 shows the MST of FIG. 8. The spanning tree of FIG. 8 may be used for fault picking by modifying it as shown in FIG. 9. In such an application MST functions may be mapped to fault picking in order to use MST to connect seed points and fault picks. As shown only the connection with the lowest costs are retained. Each node is connected to at least one other node but the costs of those connections are the lowest available.

The graph nodes, A, B, C, D, E, F, correspond to picks or nodes on the principle grid. The vertices reflect picking from the parent node to the child node. The costs may be used to reflect the confidence of the picking. By relating a higher confidence to a lower cost, the MST will correspond to the connections with the highest confidence.

Figure 10:
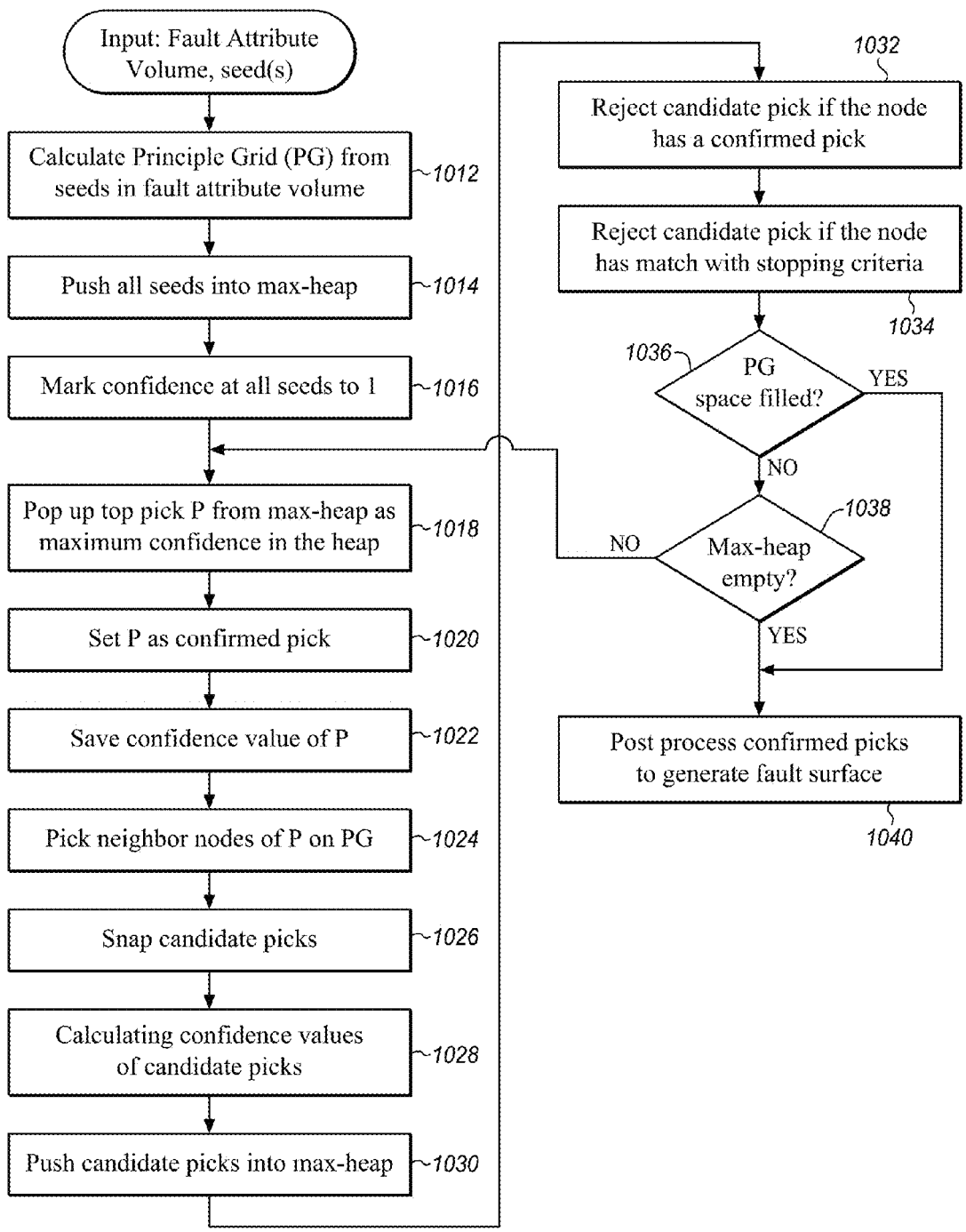
FIG. 10 is a process flow diagram of fault picking using a minimum spanning tree according to an embodiment of the invention.

FIG. 10 is a process flow diagram of fault picking in 3D using the MST as shown in FIGS. 8 and 9. This process begins with the seeds and the fault attribute volume as inputs. The process involves calculating, at 1012, the Principle Grid (PG) from seeds in the fault attribute volume. This was described in the context of FIGS. 5A, 5B, and 6.

At 1014, all the seeds are pushed into a priority queue such as a max-heap. In one example of the Max-Heap, each node in a tree has a key which is less than or equal to the key of its parent. At 1016, the confidence of all the seeds in the max-heap is marked as value 1. At 1018, the top pick P from the priority queue is popped up. The top pick may be the one that has the maximum confidence in the heap. This top pick P may be set as a confirmed pick at 1020 and then at 1022 saved together with its confidence value.

At 1024, the neighbor nodes of P on the PG are picked. These nodes are used as candidate picks. At 1026 these candidate picks are snapped and at 1028, the confidence values of the neighbor nodes are calculated. The neighbor nodes are used to form the nodes of the spanning tree and the confidence values are used to set costs on the edges between each node. At 1030, all of the neighbor node picks are pushed into the priority queue, in this example, the max-heap.

At 1032, any neighbor node candidate pick is rejected if it is already part of a confirmed pick. At 1034, any neighbor node candidate pick is rejected if it matches with any of the stopping criteria. The picking process of taking nodes from candidate pick to confirmed pick continues until the PG space is filled or until the priority queue, e.g. max-heap, is emptied.

At 1036 if the PG space is not filled then the operations from popping up the top pick at 1018 are repeated until the PG space is filled. At 1038, if the PG space is filled, then it is determined whether the priority queue is emptied. If not, then the last picks are popped up as the process returns to 1018 to process the last seeds. When the PG is filled and the queue is empty, then at 1040, the confirmed picks are post processed to generate the resulting fault surface.

The process flow of FIG. 10 uses confidence factors to determine the edge of the MST and to confirm or reject candidate picks. Confidence is used as the cost in the MST process. Confidence factors may be based on any of a variety of different factors. These factors may include any one or more of the following:
  a) Input seismic attribute amplitude Ratio (Er) between Picks: Er=1−abs(E1−E2)/(E1+E2), Where E1 is the parent pick's amplitude, and E2 is the child pick's amplitude.
  b) Distance along w-axis variations to neighbors.
  c) Distance to a projected plane with the current picked points.
  d) Distance to a projected grid with current picked points.
  e) Orientation variations to the principle grid.
  f) A set of confirmed fault picks for a Projected Plane.
  g) A set of confirmed fault picks for a Projected Grid.

Figure 11:
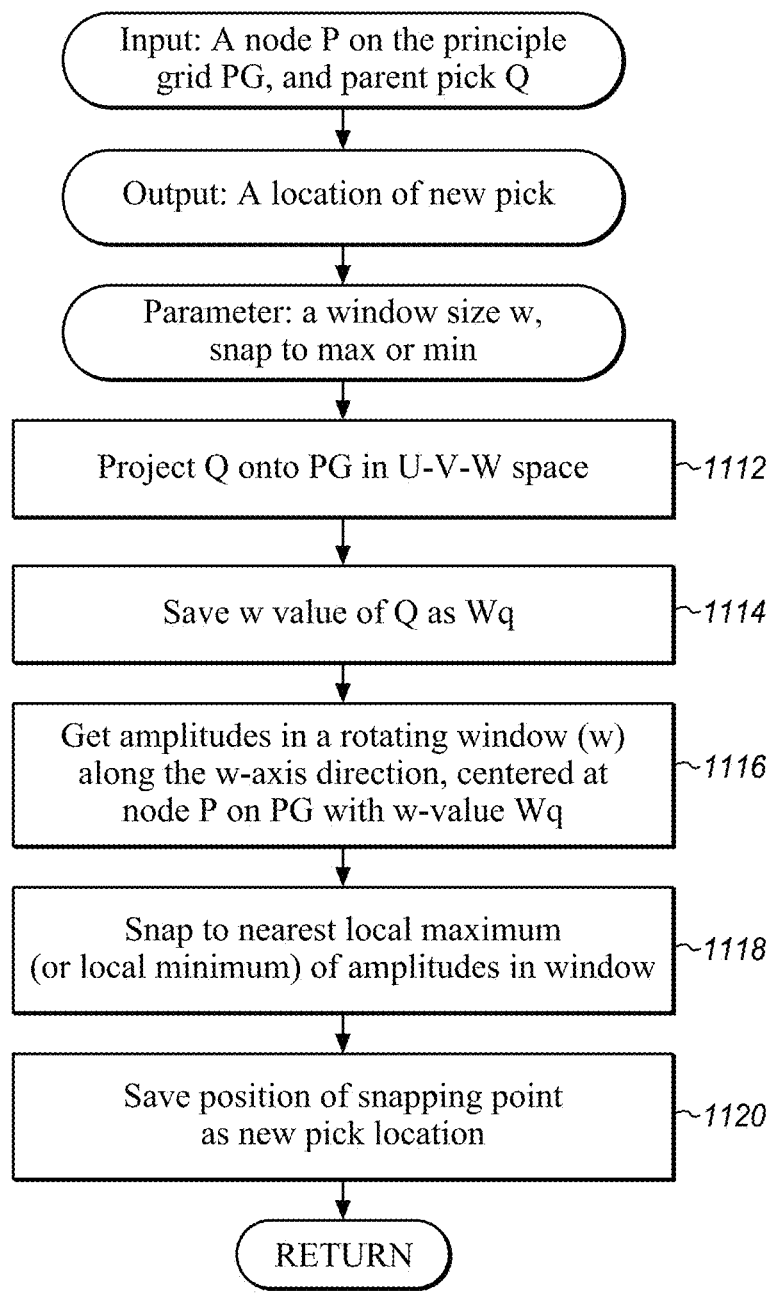
FIG. 11 is a process flow diagram of picking and snapping vertices in a minimum spanning tree according to an embodiment of the invention.

Picking and snapping may be used to determine the vertices or nodes in the MST. These are shown as items A, B, C, D, E, F in FIG. 9. In one example the vertices may be determined as shown in the process flow diagram of FIG. 11. In this process, the input is a node, P, on the principle grid, PG, and a parent pick, Q. The output is the location of the new pick and the input parameters are the window size, w, and maximum and minimum snap to values.

At 1112 the parent pick Q is projected onto PG in U-V-W space. The w position value of Q is then saved as Wq at 1114. At 1116, the amplitudes are obtained for a rotating window (of size w) along the w-axis direction. The rotating window is centered at node P on PG with w-value Wq. With this configuration then snap to can be used at 1118 to snap to the nearest local minimum or maximum of amplitudes within the rotating window. The position of the snapping point is saved at 1120 as the new pick location and the process returns to 1112 with the new pick location as the parent pick Q.

In some implementations, the Snap can be to the nearest local maximum of the amplitudes in window. In other implementations, the Snap can be to the nearest local minimum or local maximum. The particular choice of minimum or maximum may be made based on the type of fault related attribute data, the nature of the formation, the types of faults to be identified and user preference, among other factors.

As mentioned above in the fault picking process of FIG. 10 at 1034 a candidate pick will be rejected if the stopping criteria for picking and snapping are met. A variety of different stopping criteria may be used, depending on the particular implementation. These may be combined to provide a larger set of picks or a smaller set of picks. Candidate picks may be rejected if out of a selected physical boundary, such as the expected fault surface, the seismic volume, a selected smaller range, etc. Candidate picks may be rejected if out of a desired amplitude range, if the confidence is too low or too high, if the orientation of the attribute is out of range or if the pick is an outlier in any other way. A pick may be an outlier in distance away from neighbor picks, a projected plane, or a projected grid, or any other measure.

Figure 12:
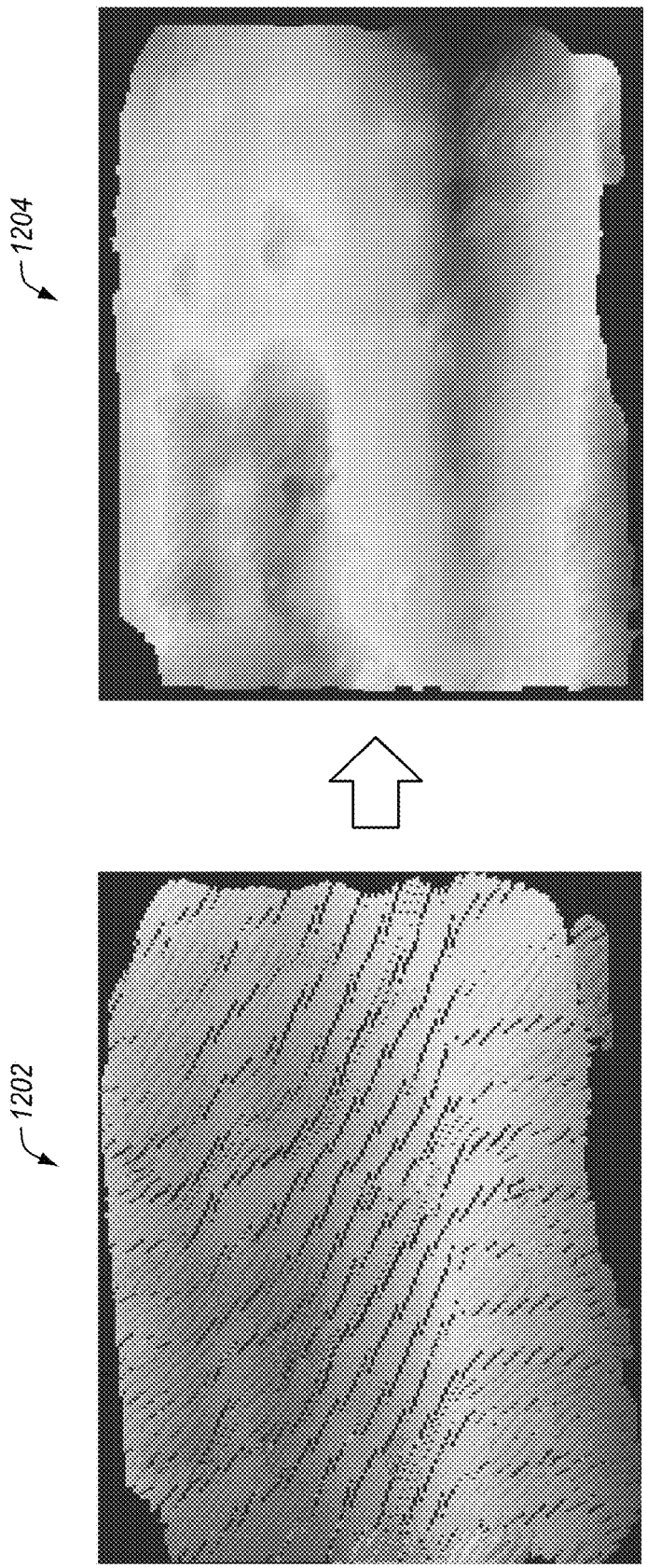
FIG. 12 is an illustration of a fault surface before and after picking and snapping according to an embodiment of the invention.

FIG. 12 shows a fault surface 1202 as it must appear after picking and snapping is completed. The diagram of FIG. 12 is a representation of a 3D volume with 3D curves represented on the seismic volume. These 3D curves indicate potential faults. FIG. 12 also shows the same fault surface 1204 as it may appear after post-processing.

Figure 13:
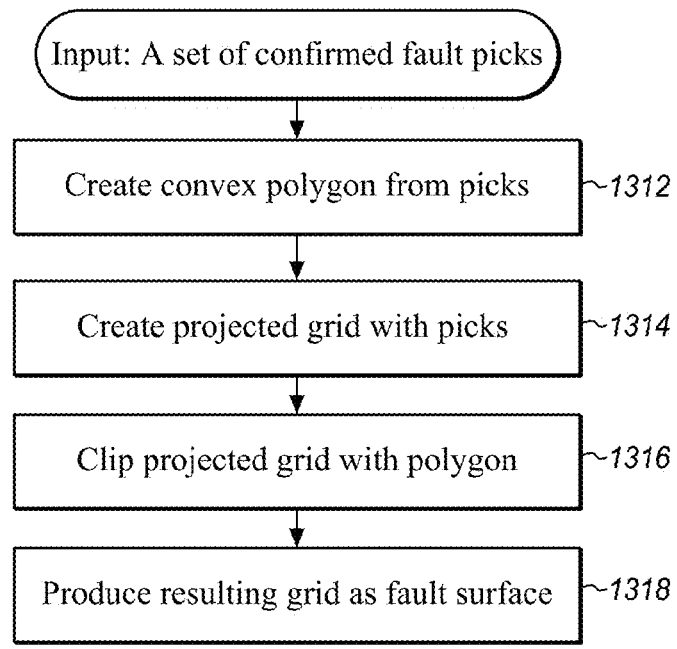
FIG. 13 is a process flow diagram of post processing applied to a set of confirmed fault picks according to an embodiment of the invention.

Post processing 206 is shown in FIG. 2 as having multiple operations or modules that may or may not be used together or combined with other operations or modules. A particular example process flow for post processing is shown in the process flow diagram of FIG. 13. The process of FIG. 13 uses the set of confirmed fault picks that are produced, for example, by the process of FIGS. 10 and 11 using the MST. The input surface may be similar to the starting surface 1202 of FIG. 12.

At 1312, a convex polygon is created from the confirmed fault picks. At 1314, a projected grid is created with the picks. At 1316, The projected grid is clipped with the polygon from 1312, and at 1318, the resulting grid is produced as the fault surface, such as 1204 of FIG. 12.

The described cost selection-based methodology of picking faults allows direct picking on fault attributes. It allows for the principle grid to be defined automatically. It optimizes the surface construction process. High-accuracy and high-resolution can be provided and the fault surface attributes are generated as by-products. The confidence attribute of the MST allows for the level of quality to be tuned for any implementation. The method also provides flexibility in offering a variety of flexibility and configuration options. Single or multiple seeds may be used. Even fault segments may be used as seeds. Seeds from vertical and horizontal seismic slices, may also be used.

Figure 14:
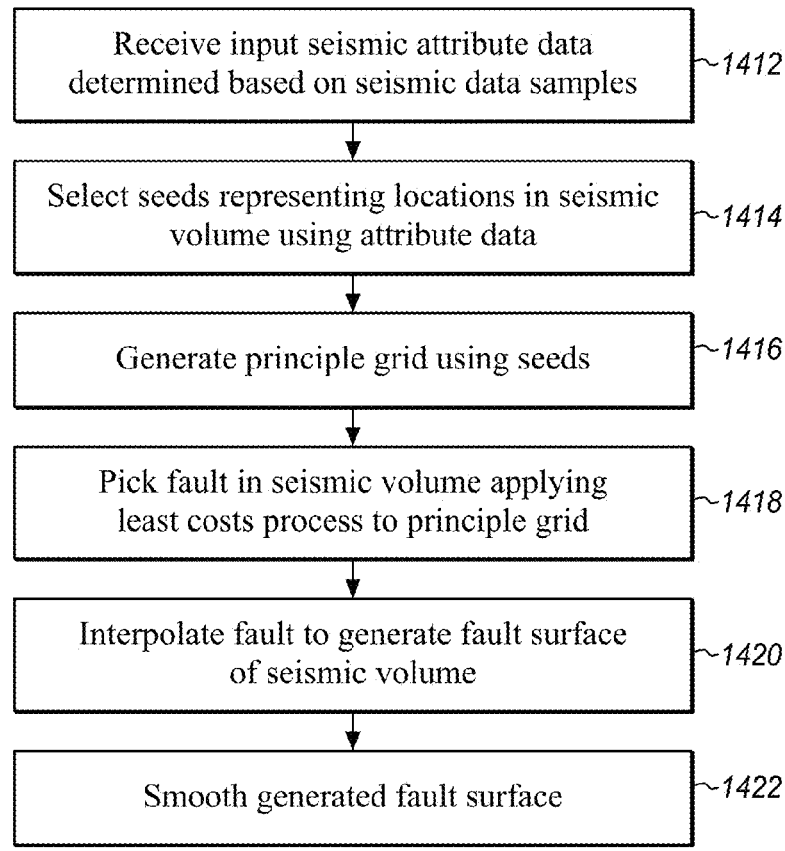
FIG. 14 is a process flow diagram of seeking faults in seismic data samples according to an embodiment of the invention.

FIG. 14 is a process flow diagram of an example method of seeking faults in seismic data samples from a three-dimensional seismic volume. At 1412, input seismic attribute data is received. The input seismic attribute data is determined based on the seismic data samples. At 1414 seeds are selected using the attribute data. The seeds represent locations in the seismic volume. The seeds may be selected by picking an initial seed point using the seismic attribute data, and then picking additional points of the seismic volume using the initial seed point. The initial seed point may be picked in any of a variety of different ways. One way is to average locations of the additional points of the seismic volume, determine a central location using the averaged locations, and then select an initial seed point that is the nearest to the central point. This initial seed point may then be used as the origin of a principle grid.

At 1416 a principle grid such as that of FIG. 4 is constructed using the seeds. As described above, the principle grid may be a linear plane that is related to the fault surface. Given an initial point on the grid, additional points may be added. These may come from seismic fault related attributes or in another way. In one example, a step size is established and the principle grid is traversed grid in orthogonal directions. Additional points are picked at each step in each direction. This traversing may be limited to a selected volume size. The volume size acts as a limit in each orthogonal direction.

At 1418 a fault in the seismic volume is picked by applying a least costs process to the principle grid, such as MST as described in the context of FIG. 8. The principle grid may be generated by assigning an initial seed point and additional points to the principle grid and then assigning costs to vertices between points on the grid. The fault may then be picked by applying the minimum spanning tree (MST) between seeds of the grid. The MST may be defined on the principle grid so that graph nodes of the principle grid are the selected seeds and vertices of the principle grid are paths from a parent node to a child node. The cost between vertices can be any of the costs described above. These may include a difference in amplitude of the input seismic attribute data between a first and second node, a physical distance on the principle grid between a first and a second node, a distance to a projected plane formed from currently picked points from the plane of the principle grid, a difference in orientation between a projected plane formed from currently picked points from the plane of the principle grid, or any combination of these, among others.

At 1420, the fault is interpolated to generate a fault surface of the seismic volume, and at 1422 the generated fault surface is smoothed. Other post-processing may also be applied.

As described above faults in a seismic section may be picked using an MST. The fault may be picked using a single seed or multiple seeds. The MST provides a least costs seeking process to pick a fault. The graph nodes of the MST may be determined as picks on a principle grid node and vertices of the MST are then the picking from the parent node to the child node of the principle grid. The costs are on the vertices and are related to a confidence of picking a particular fault. The fault picking may be a part of a greater fault picking workflow that also includes one or more of determining attributes in input seismic data, enhancing the determined attributes, pre-processing the input seismic data, and post processing the determined attributes.

Figure 15:
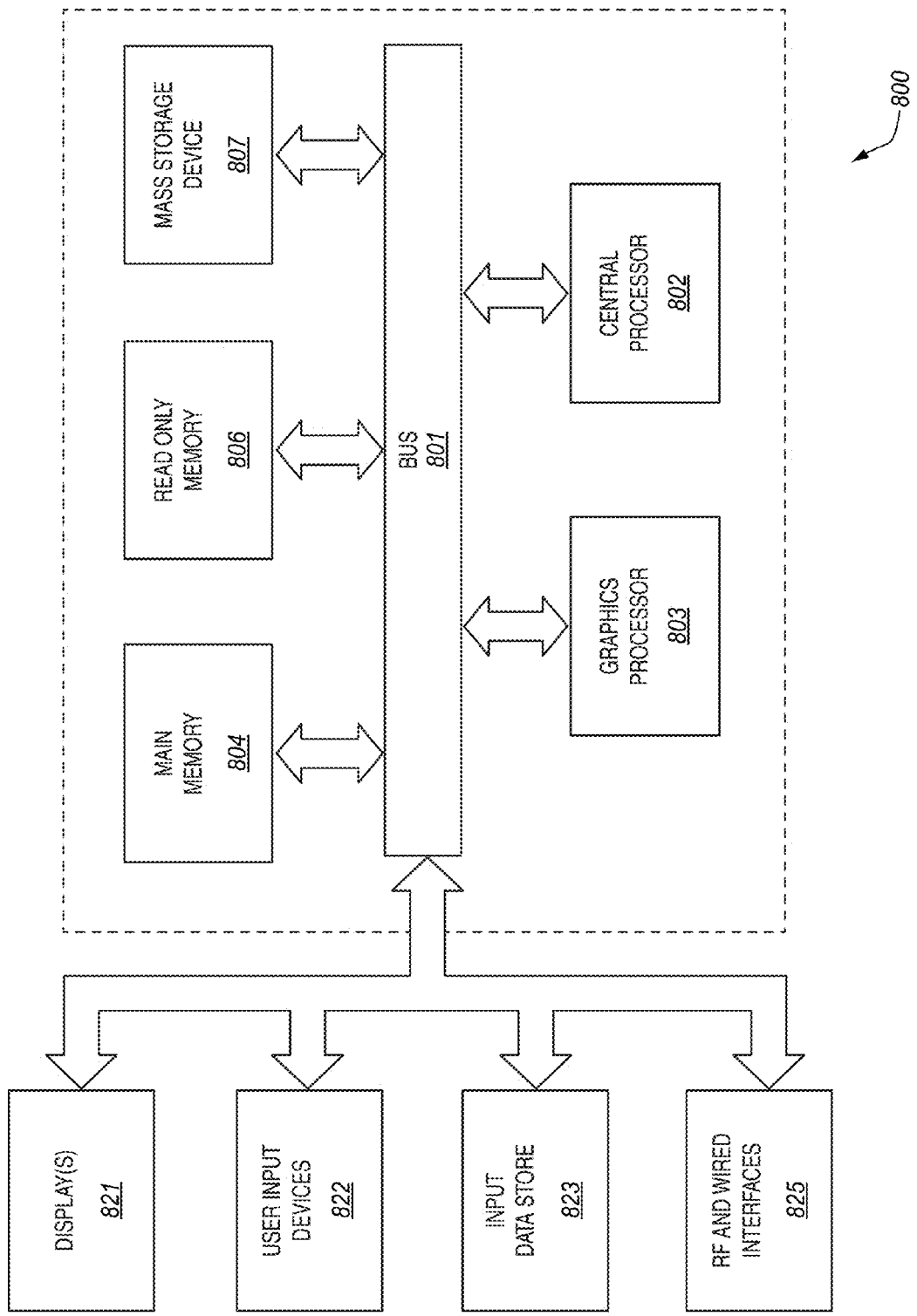
FIG. 15 is an example of a computing system suitable for implementing embodiments of the present invention.

FIG. 15 is a block diagram of a computing system suitable for use in evaluating input seismic data, finding attributes, enhancing attributes, and picking faults, polylines and more as described above, such as a personal computer, workstation computer, minicomputer, main frame computer, server, etc.

The device computer system 800 includes a bus or other communication means 801 for communicating information, and a processing means such as one or more microprocessors 802 coupled with the bus 801 for processing information. The computer system may be augmented with a graphics processor 803 specifically for rendering graphics through parallel pipelines. These processors may be incorporated into the central processor 802 or provided as one or more separate processors.

The computer system 800 further includes a main memory 804, such as a random access memory (RAM) or other dynamic data storage device, coupled to the bus 801 for storing information and instructions to be executed by the processor 802. The main memory also may be used for storing temporary variables or other intermediate information during execution of instructions by the processor. The computer system may also include a nonvolatile memory 806, such as a read only memory (ROM) or other static data storage device coupled to the bus for storing static information and instructions for the processor.

A mass memory 807 such as a magnetic disk, optical disc, or solid state array and its corresponding drive may also be coupled to the bus of the computer system for storing information and instructions. The computer system can also be coupled via the bus to a display device or monitor 821, such as a Liquid Crystal Display (LCD) or Organic Light Emitting Diode (OLED) array, for displaying information to a user. For example, graphical and textual indications of installation status, operations status and other information may be presented to the user on the display device, in addition to the various views and user interactions discussed above.

Typically, user input devices, such as a keyboard with alphanumeric, function and other keys, may be coupled to the bus for communicating information and command selections to the processor. Additional user input devices may include a cursor control input device such as a mouse, a trackball, a trackpad, or cursor direction keys can be coupled to the bus for communicating direction information and command selections to the processor and to control cursor movement on the display 821.

Input data stores 823 are coupled to the bus to provide input seismic data or intermediate values from other computer systems as mentioned above.

Communications interfaces 825 are also coupled to the bus 801. The communication interfaces may include a modem, a network interface card, or other well known interface devices, such as those used for coupling to Ethernet, token ring, or other types of physical wired or wireless attachments for purposes of providing a communication link to support a local or wide area network (LAN or WAN), for example. In this manner, the computer system may also be coupled to a number of peripheral devices, other clients, control surfaces or consoles, or servers via a conventional network infrastructure, including an Intranet or the Internet, for example.

A lesser or more equipped system than the example described above may be preferred for certain implementations. Therefore, the configuration of the example system 800 will vary from implementation to implementation depending upon numerous factors, such as price constraints, performance requirements, technological improvements, or other circumstances.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection). Accordingly, as used herein, a machine-readable medium may, but is not required to, comprise such a carrier wave.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. A method of picking a fault in seismic data samples from a three-dimensional seismic volume, the method comprising:
   receiving input seismic attribute data determined based on the seismic data samples;
   selecting seeds representing locations in the seismic volume using the attribute data;
   generating a principle grid using the seeds;
   picking a fault in the seismic volume by applying a least costs process to the principle grid;
   interpolating the fault to generate a fault surface of the seismic volume; and
   smoothing the generated fault surface.

2. The method of claim 1, wherein the principle grid is a linear plane that is related to the fault surface.

3. The method of claim 1, wherein selecting seeds comprises:
   picking an initial seed point using the seismic attribute data; and
   picking additional seed points of the seismic volume using the initial seed point.

4. The method of claim 3, wherein picking an initial seed point comprises:
   averaging locations of the additional points of the seismic volume;
   determining a central location using the averaged locations; and
   selecting an initial seed point that is the nearest to the central point.

5. The method of claim 4, wherein generating the principle grid comprises assigning the central location as an origin of the principle grid.

6. The method of claim 3, wherein generating a principle grid comprises:
   assigning the initial seed point and the additional seed points to the principle grid; and
   assigning costs to vertices between points on the grid, and wherein picking a fault comprises applying a minimum spanning tree (MST) between seed points of the grid.

7. The method of claim 3, wherein picking additional seed points comprises:
   establishing a step size; and
   traversing the principle grid in orthogonal directions and picking additional seed points at each step in each direction.

8. The method of claim 7, further comprising establishing a volume size as a limit in each orthogonal direction and wherein traversing comprises traversing within the established volume size.

9. The method of claim 1, wherein the least costs process includes a minimum spanning tree on the principle grid in which graph nodes of the principle grid are the picked seed points and vertices of the principle grid paths from a parent node to a child node.

10. The method of claim 9, wherein a cost between a first node and a second node of the least costs process is determined using at least one of:
   a difference in amplitude of the input seismic attribute data between a first and second node;
   a physical distance on the principle grid between a first and a second node;
   a distance to a projected plane formed from currently picked points from the plane of the principle grid; and
   a difference in orientation between a projected plane formed from currently picked points from the plane of the principle grid.

11. A method of picking a fault in seismic data samples, the method comprising:
   picking a fault in a seismic section using a minimum spanning tree (MST) as a least costs seeking process to pick a fault, wherein the least costs seeking process includes an MST in which graph nodes of the MST are the pick on a principle grid node and vertices of the MST are the picking from the parent node to the child node of the principle grid.

12. The method of claim 11, wherein picking a fault comprises picking a fault using multiple seeds.

13. The method of claim 11, wherein the costs are related to a confidence of picking a fault.

14. The method of claim 11, wherein the principle grid is a linear plane that is related to the fault surface.

15. The method of claim 11, wherein confidence is used as costs and picks are used as nodes of the MST.

16. The method of claim 11, in a fault picking workflow that also includes one or more of determining attributes in input seismic data, enhancing the determined attributes, pre-processing the input seismic data, and post processing the determined attributes.

17. A computer-readable medium having instructions stored thereon that when operated on by the computer cause the computer to perform operations for picking a fault in seismic data samples from a three-dimensional seismic volume, the operations comprising:
    receiving input seismic attribute data determined based on the seismic data samples;
    selecting seeds representing locations in the seismic volume using the attribute data;
    generating a principle grid using the seeds;
    picking a fault in the seismic volume by applying a least costs process to the principle grid;
    interpolating the fault to generate a fault surface of the seismic volume; and
    smoothing the generated fault surface.

18. An apparatus comprising:
    an input module to receive input seismic attribute data determined based on seismic data samples from a three-dimensional seismic volume
    a fault seeker engine to select seeds representing locations in the seismic volume using the attribute data, to generate a principle grid using the seeds, to pick a fault in the seismic volume by applying a least costs process to the principle grid, and to interpolate the fault to generate a fault surface of the seismic volume; and
    a post processing module to smooth the generated fault surface.

19. An apparatus for picking a fault in seismic data samples from a three-dimensional seismic volume, the apparatus comprising:
    means for receiving input seismic attribute data determined based on the seismic data samples;
    means for selecting seeds representing locations in the seismic volume using the attribute data;
    means for generating a principle grid using the seeds; and
    means for picking a fault in the seismic volume by applying a least costs process to the principle grid;
    wherein the apparatus is configured to interpolate the fault to generate a fault surface of the seismic volume; and
    wherein the apparatus is further configured to smooth the generated fault surface.

* * * * *